US008146879B2

(12) United States Patent
Liao

(10) Patent No.: US 8,146,879 B2
(45) Date of Patent: Apr. 3, 2012

(54) UMBRELLA HOLDER

(75) Inventor: Gordon Liao, Yung Kang (TW)

(73) Assignee: Unique Product & Design Co., Ltd., Yung Kang, Tainan Hsien (TW)

( * ) Notice: Subject to any disclaimer, the term of this patent is extended or adjusted under 35 U.S.C. 154(b) by 0 days.

(21) Appl. No.: 12/858,541

(22) Filed: Aug. 18, 2010

(65) Prior Publication Data

US 2012/0043448 A1 Feb. 23, 2012

(51) Int. Cl.
*F16M 13/00* (2006.01)
*F16M 11/00* (2006.01)
*A01K 97/10* (2006.01)
*A45B 25/28* (2006.01)
*A47G 33/12* (2006.01)
*A47G 29/00* (2006.01)
*H01Q 1/12* (2006.01)
*E04G 3/00* (2006.01)
*A47F 5/00* (2006.01)

(52) U.S. Cl. ........ 248/514; 248/534; 248/540; 248/541; 248/515; 248/511; 248/230.1; 248/689; 248/278.1; 248/292.12; 403/97; 403/146; 135/16; 135/19; 135/135

(58) Field of Classification Search .................. 248/514, 248/534, 540, 541, 515, 511, 230.1, 689, 248/278.1, 292.12; 403/97, 146; 135/16, 135/19, 135
See application file for complete search history.

(56) References Cited

U.S. PATENT DOCUMENTS

| 4,614,452 | A | * | 9/1986 | Wang | 403/27 |
| 5,265,839 | A | * | 11/1993 | Buckley | 248/538 |
| 5,588,630 | A | * | 12/1996 | Chen-Chao | 248/514 |
| 5,620,272 | A | * | 4/1997 | Sheng | 403/96 |
| 5,836,327 | A | * | 11/1998 | Davis | 135/16 |
| 5,964,439 | A | * | 10/1999 | Johnson | 248/278.1 |
| 6,276,651 | B1 | * | 8/2001 | Dolan | 248/538 |
| 6,446,923 | B1 | * | 9/2002 | Olkkola | 248/278.1 |
| 6,450,517 | B1 | * | 9/2002 | Lee | 280/87.041 |
| 6,520,574 | B1 | * | 2/2003 | Huang | 297/184.16 |
| 6,619,872 | B2 | * | 9/2003 | Crorey et al. | 403/97 |
| 7,448,590 | B1 | * | 11/2008 | Holton | 248/534 |
| 7,461,826 | B2 | * | 12/2008 | Carnevali | 248/292.12 |
| 2005/0056751 | A1 | * | 3/2005 | Slatter | 248/288.11 |
| 2006/0102824 | A1 | * | 5/2006 | Carnevali | 248/534 |
| 2007/0074446 | A1 | * | 4/2007 | Wilcox et al. | 43/21.2 |

* cited by examiner

*Primary Examiner* — Terrell McKinnon
*Assistant Examiner* — Christopher Garft
(74) *Attorney, Agent, or Firm* — Alan Kamrath; Kamrath IP Lawfirm, PA

(57) ABSTRACT

An umbrella holder includes a hollow tube for placing an umbrella handle. A fixing mechanism assembled is on the hollow tube and has a rotary button with a threaded rod screwed with a fixing block in the tube for tightening or releasing the umbrella handle, with a stop plate positioning the threaded rod of the rotary button. A first angle-adjusting mechanism is positioned under the hollow tube and has an immovable geared disk and a movable geared disk mounted on a rotary base and has an eccentric actuating member to engage or disengage the immovable and the movable geared disks. The holder also has a second angle-adjusting mechanism assembled under the first angle-adjusting mechanism and having an immovable geared disk with a fixed shaft and a movable geared disk disposed on a base having an eccentric actuating member for engaging or disengaging the immovable and the movable geared disks of the second angle-adjusting mechanism.

6 Claims, 9 Drawing Sheets

92

UMBRELLA HOLDER

BACKGROUND OF THE INVENTION

1. Field of the Invention

This invention relates to an umbrella holder and, particularly, to an umbrella holder which is safe and comfortable in use and convenient and quick in operation.

2. Description of the Prior Art

A conventional umbrella holder, as used for a golf handcart, is assembled on a handle or a scoreboard. The conventional umbrella holder, as shown in FIGS. 1 and 2, includes a fixing mechanism 1, two angle-adjusting devices 2, 3 and a fixing plate 4 combined together. The fixing mechanism 1 mounted on a hollow tube 10 is provided with a first rotary button 11 with a threaded rod for actuating a fixing block 12 to shift and tighten or release an umbrella handle placed in the interior of the hollow tube 10. The two angle-adjusting devices 2, 3 positioned under the tube 10 are respectively disposed with a second rotary button 21 and a third rotary button 31 that are rotated to turn geared disks for adjusting various angles of the tube 10. The fixing plate 4 is assembled at a lower side of a flat-bottom geared disk 32 and provided with two screw bolts 41 for securing the umbrella holder on the scoreboard of a golf handcart.

However, the conventional umbrella holder has the following drawbacks that need to be improved.

1. When the fixing mechanism 1 is released, the first rotary button 11 will protrude out of the tube 10 to spoil the whole external look, not only resulting in visual discomfort, but also likely to harm a user in case of bumping against the protruding first rotary button 11.
2. The second and third rotary buttons 21, 31 must be turned around for several rounds in order to adjust the angles of the tube 10, causing much trouble and taking lots of time.
3. To disassemble the tube 10, the second rotary button 21 has to be turned and released for about eight rounds so that the second rotary button 21 and the two angle-adjusting devices 2, 3 can respectively be separated from the tube 10, thus causing trouble, taking much time and being liable to cause loss of parts (buttons).

SUMMARY OF THE INVENTION

The first objective of this invention is to offer an umbrella holder integral in the external look and safe and comfortable in use.

The second objective of this invention is to offer an umbrella holder quick in its angle adjustment and in its disassembly and convenient in operation.

The umbrella holder in the present invention includes a hollow tube for placing an umbrella handle therein. A fixing mechanism assembled on the hollow tube provided with a rotary button with a threaded rod that is screwed with a fixing block positioned in the interior of the tube is able to tighten or release the umbrella handle, with a stop plate fixing the threaded rod of the rotary button in position. The holder also has a first angle-adjusting mechanism positioned under the hollow tube, and the first angle-adjusting mechanism is disposed with an immovable geared disk and a movable geared disk matching each other. The movable geared disk is assembled on a rotary base set thereon with an eccentric actuating member operated to make the immovable geared disk engaged with or disengaged from the movable geared disk. The holder further has a second angle-adjusting mechanism mounted under the first angle-adjusting mechanism and provided with an immovable geared disk and a movable geared disk matching each other. The immovable geared disk of the second angle-adjusting mechanism is positioned at the underside of the rotary base and has a fixed shaft secured thereon. The movable geared disk of the second angle-adjusting mechanism is fixed at the upper end of a base that is pivotally disposed with an eccentric actuating member able to be clamped with or separated from the fixed shaft for making the immovable geared disk engaged with or disengaged from the movable geared disk of the second angle-adjusting mechanism.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
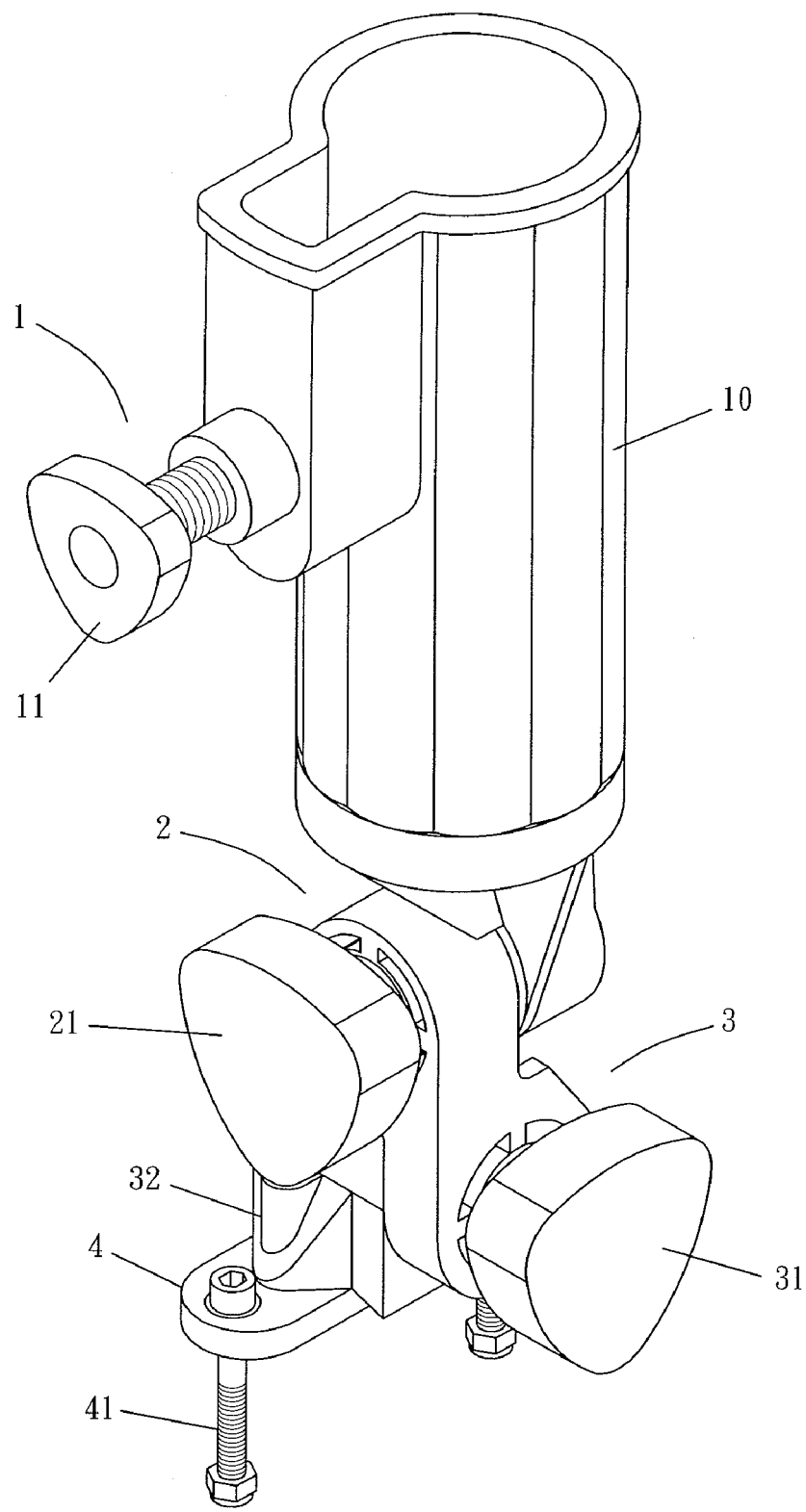
FIG. 1 is a perspective view of a conventional umbrella holder.
Figure 2:
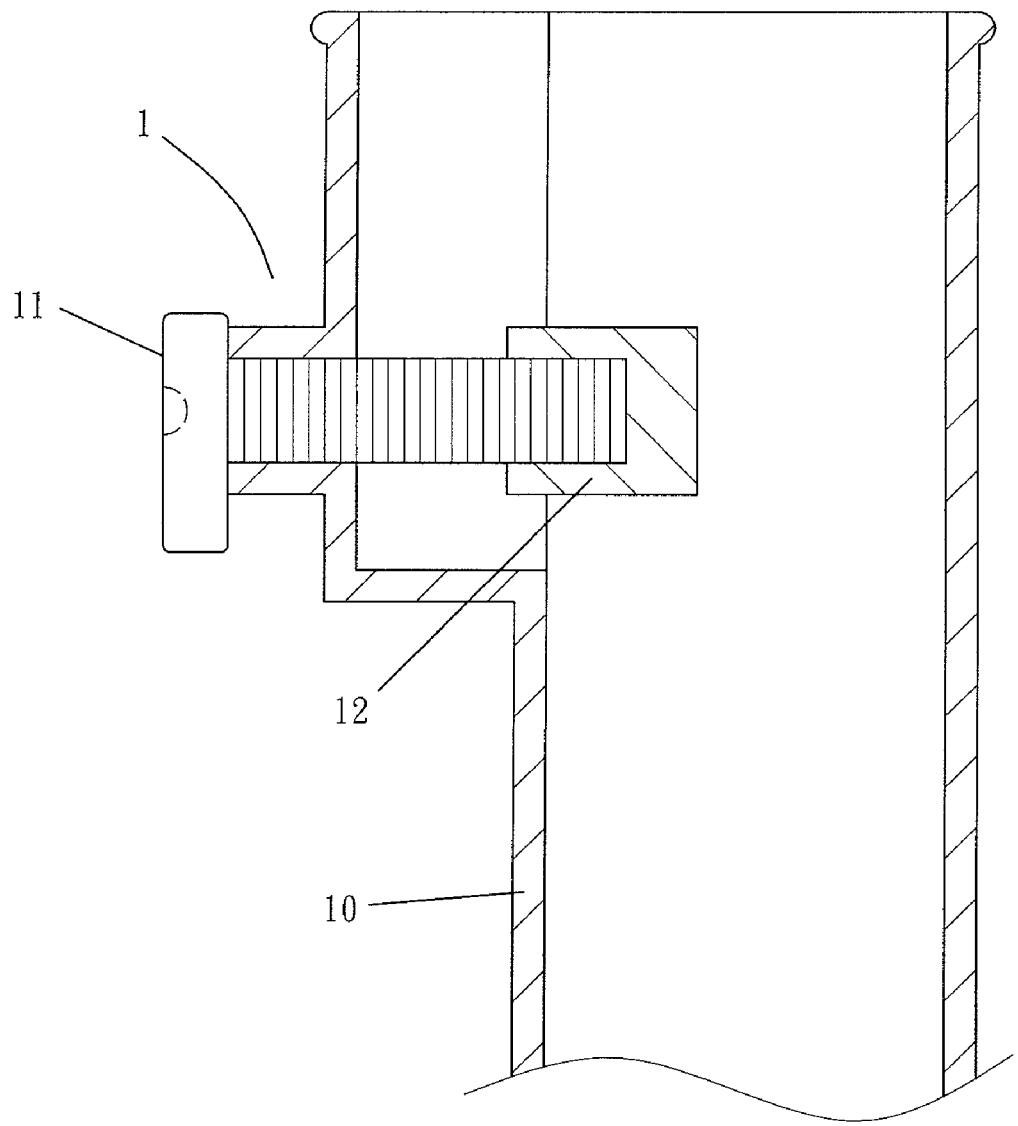
FIG. 2 is a partial cross-sectional view of a fixing mechanism of the conventional umbrella holder.

A preferred embodiment of an umbrella holder in the present invention, as shown in FIGS. 3-7, includes a fixing mechanism 5, a first adjusting mechanism 6, a second adjusting mechanism 7 and a pipe sleeve 8 as main components combined together.

The fixing mechanism 5 assembled on a hollow tube 50 is composed of a rotary button 51 with a threaded rod, a stop plate 52 and a fixing block 53. The threaded rod of the rotary button 51 is inserted in the interior of the tube 50 and has its end screwed with the fixing block 53, with the rotary button 51 flatly and closely attached in a recess 54 at an outer side of the tube 50. The stop plate 52 has its lower end mounted astride on the threaded rod of the rotary button 51 and its upper end inserted in the tube 50 for stabilizing and positioning the rotary button 51 and letting the threaded rod turn idle. When the rotary button 51 is turned around, the fixing block 53 will be actuated to shift backward and forward for releasing or tightening an umbrella handle A in the tube 50, but the rotary button 51 will not be shifted together with the fixing block 53.

The first adjusting mechanism 6 is composed of an immovable geared disk 61 positioned under the tube 50, a rotary base 62 having an upper side provided with a movable geared disk 621 for matching with the immovable geared disk 61, a shaft rod 63 inserted through the center of the two geared disks 61, 621, a spring 64 fitted on the shaft rod 63 and located between the immovable geared disk 61 and the rotary base 62, and an eccentric actuating member 65 eccentrically and pivotally connected with the shaft rod 63 and positioned in a recessed chamber 622 at one side of the rotary base 62. When pressed downward, the eccentric actuating member 65 will push the rotary base 62 to mutually engage the two geared disks 61, 621 for carrying out adjustment and positioning. When the eccentric actuating member 65 is pulled upward, the rotary base 62, by the resilience of the spring 64, will disengage the two geared disks 61, 621 from each other for adjusting angles (directions). The eccentric actuating member 65 can be pressed downward once again for positioning.

The second adjusting mechanism 7 assembled under the first adjusting mechanism 6 is composed of an immovable geared disk 71 positioned at the lower end of the rotary base 62. A fixed shaft 72 protrudes downward from the center of the immovable geared disk 71 and has its lower end cut with an annular engage recess 721. A flat-bottom base 73 is fitted on the fixed shaft 72 and has its upper end provided with a movable geared disk 731 to match with the immovable geared disk 71 and has one side formed with a recessed chamber 732. The second adjusting mechanism 7 is further provided with an eccentric actuating member 74 that is eccentrically and pivotally connected with one end of the recessed chamber 732 of the flat-bottom base 73 and has an engage hook 741 to be engaged with the engage recess 721 of the fixed shaft 72. If the eccentric actuating member 74 is pressed down, the engage hook 741 engages with the engage recess 721, fixing the flat-bottom base 73 and engaging the two geared disks 71, 731 with each other and positioned in place. When the eccentric actuating member 74 is pulled upward, the engage hook 741 will be separated from the engage recess 721, and the flat-bottom base 73 will be released to disengage the two geared disks 71, 731 from each other for facilitating angle adjustment. Then, the actuating member 74 can be pressed down anew for positioning in place.

The pipe sleeve 8 assembled under the flat-bottom base 73 consists of an upper half pipe sleeve 81 and a semi-circular lower half pipe sleeve 82 combined together. Two fixing bolts 83 are secured at the underside of the flat-bottom base 73 and are extended downward to be inserted through both the upper and the lower half pipe sleeves 81, 82 for fixing them in position. The upper half pipe sleeve 81 has its upper end formed with a flat surface to match with the flat-bottom base 73 for facilitating them to be clamped on the scoreboard of a golf handcart. The lower end of the upper half pipe sleeve 81 and the lower half pipe sleeve 82 are respectively semi-circular shaped and able to be combined together to make up a round hole for clamping the handle pipe of a golf handcart.

As can be understood from the above description, this invention has the following advantages.

Figure 3:
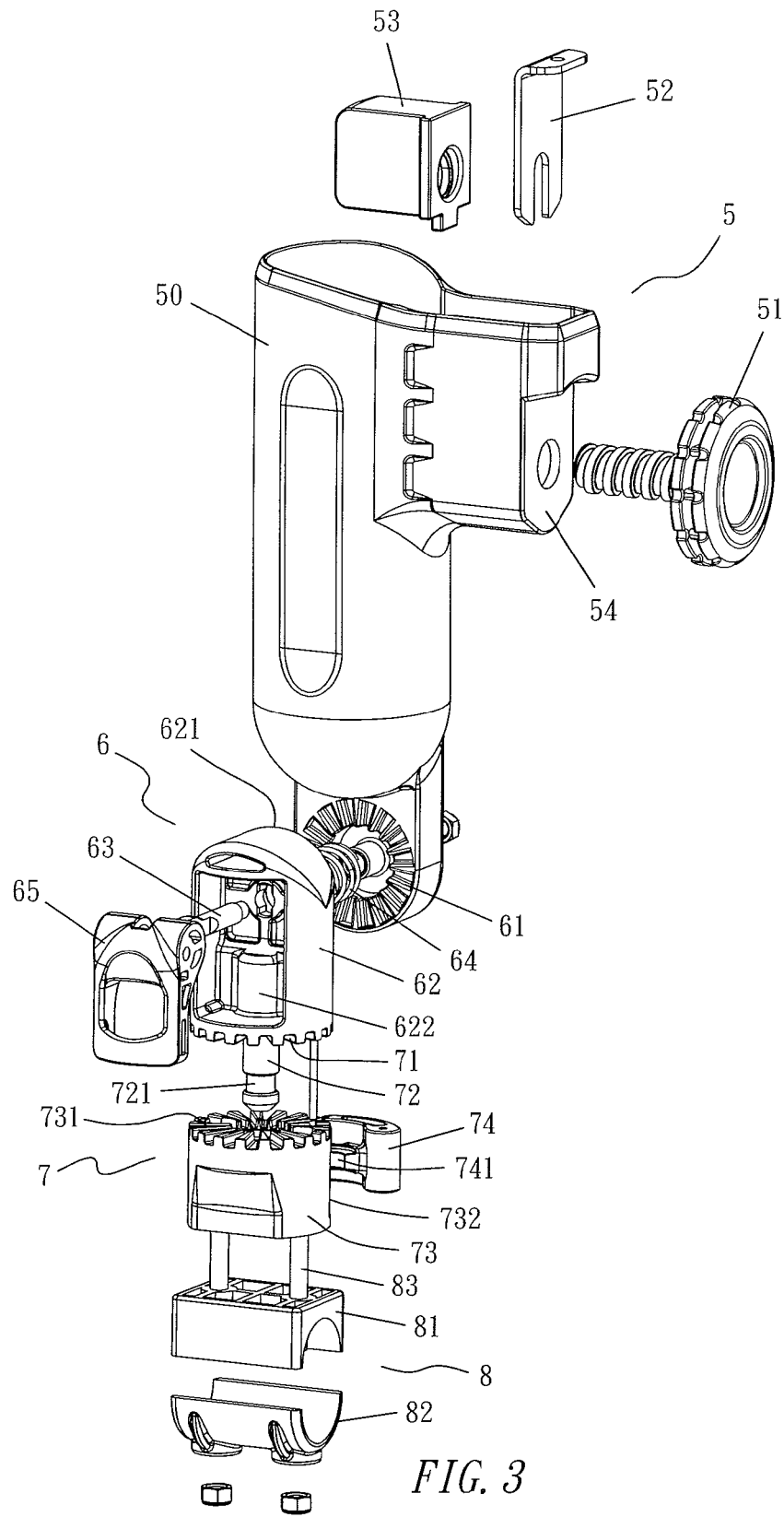
FIG. 3 is an exploded perspective view of an umbrella holder in the present invention.
Figures 4, 5:
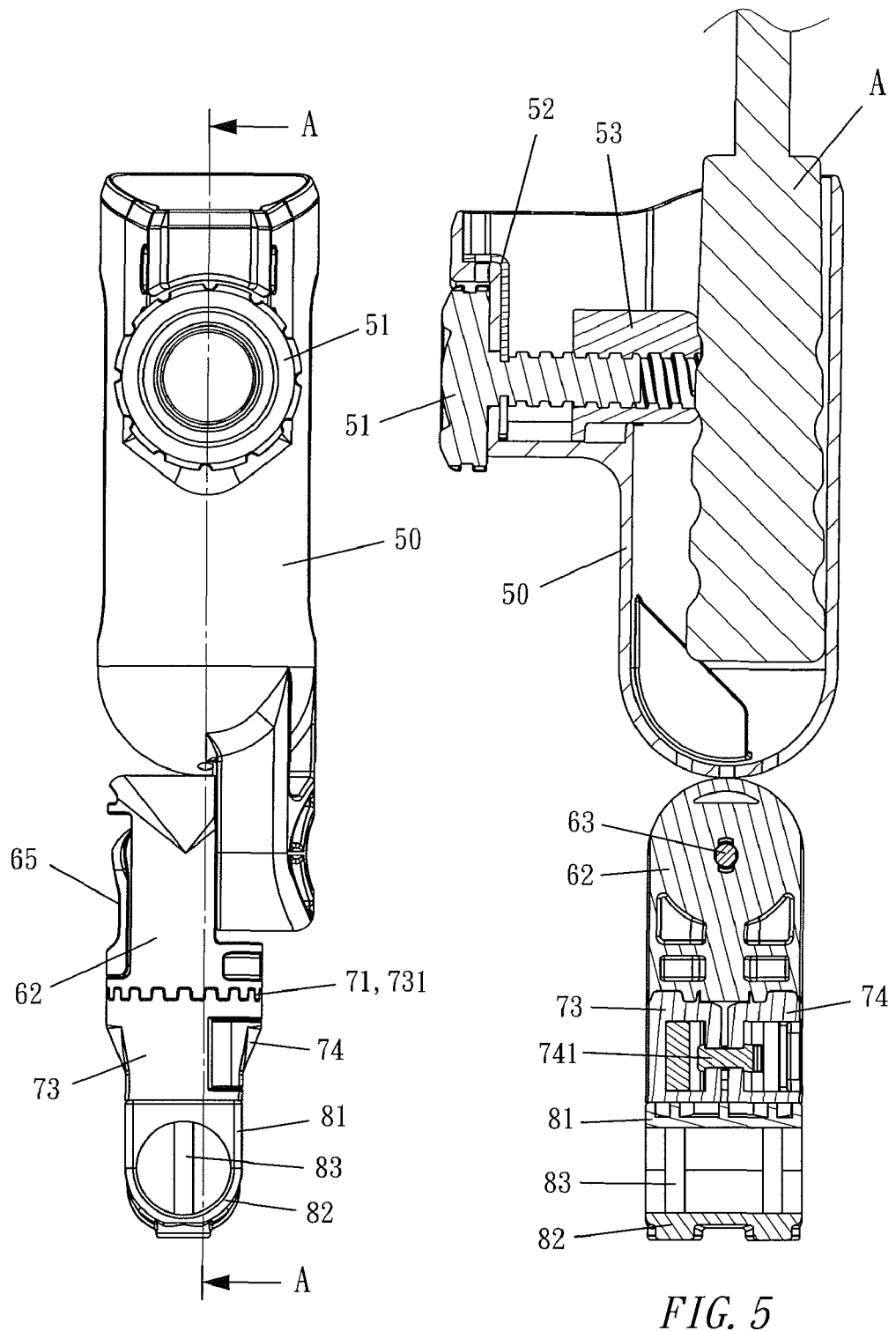
FIG. 4 is a front view of the umbrella holder in the present invention.
FIG. 5 is a cross-sectional view of the line A-A in FIG. 4.
Figures 6, 7:
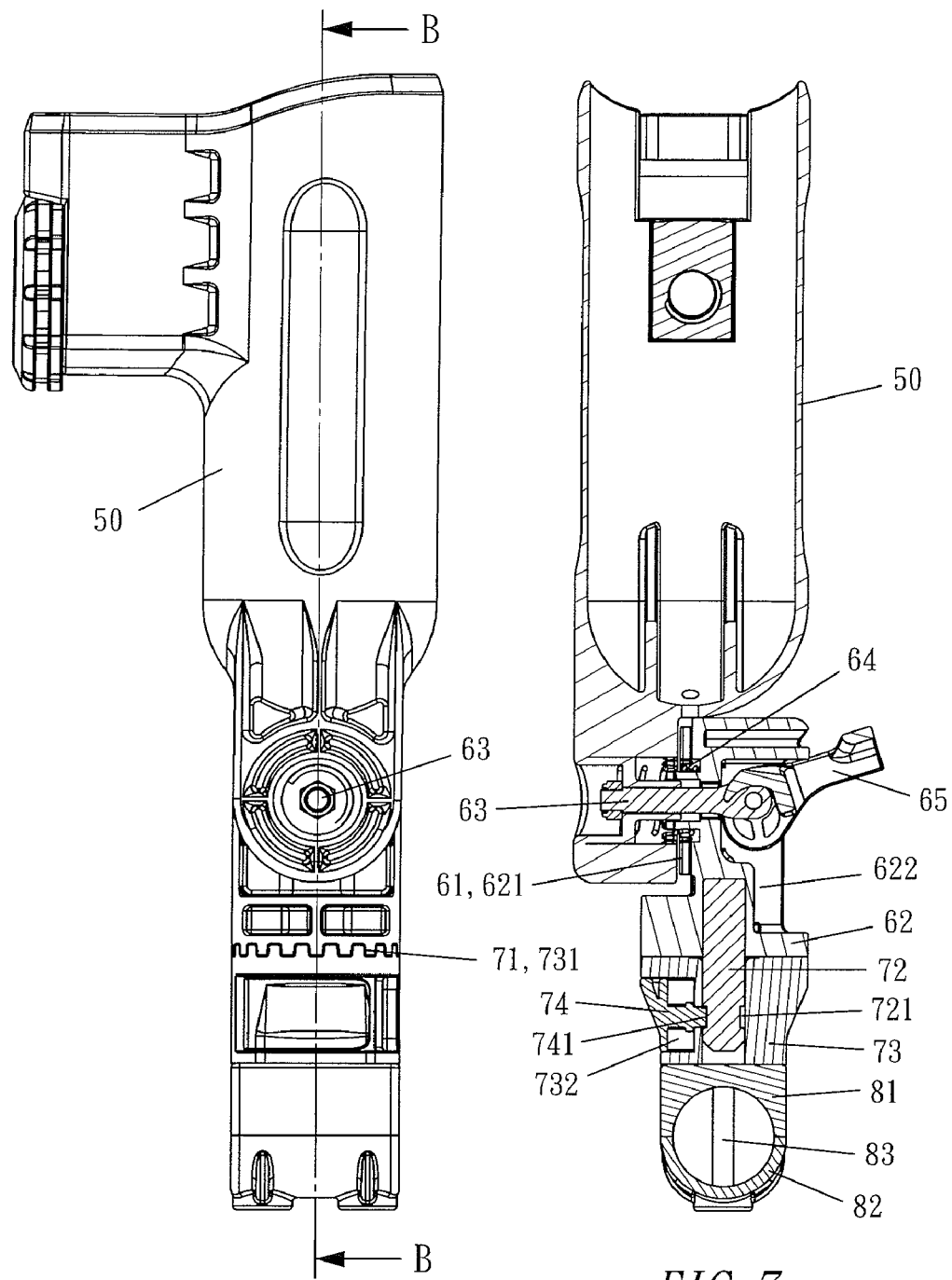
FIG. 6 is a side-sectional view of the umbrella holder in the present invention.
FIG. 7 is a cross-sectional view of the line B-B in FIG. 6.
Figure 8:
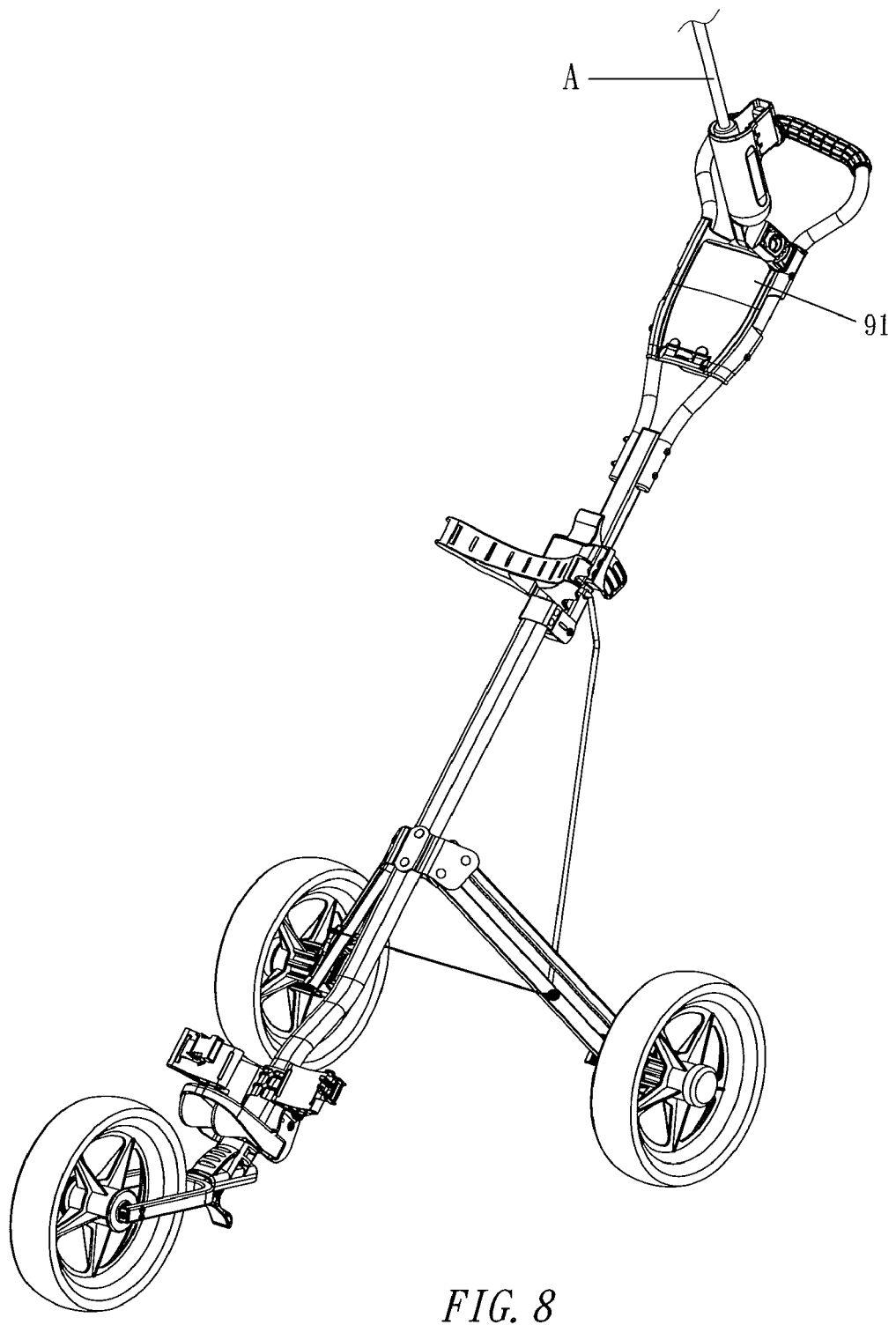
FIG. 8 is a perspective view of the umbrella holder assembled on the scoreboard of a golf handcart in the present invention.
Figure 9:
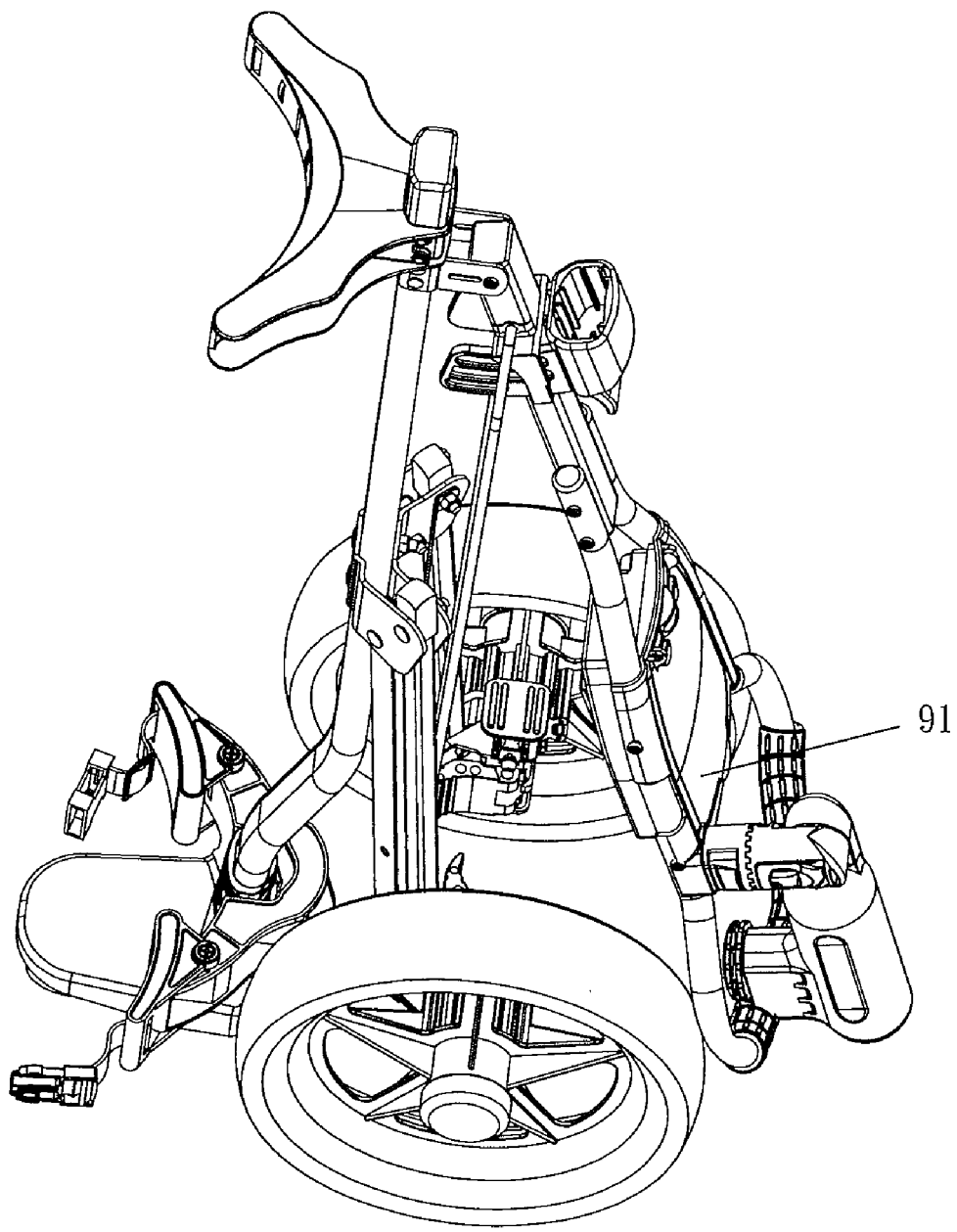
FIG. 9 is a perspective view of the umbrella holder assembled on the scoreboard of a golf handcart in a collapsed condition in the present invention.
Figure 10:
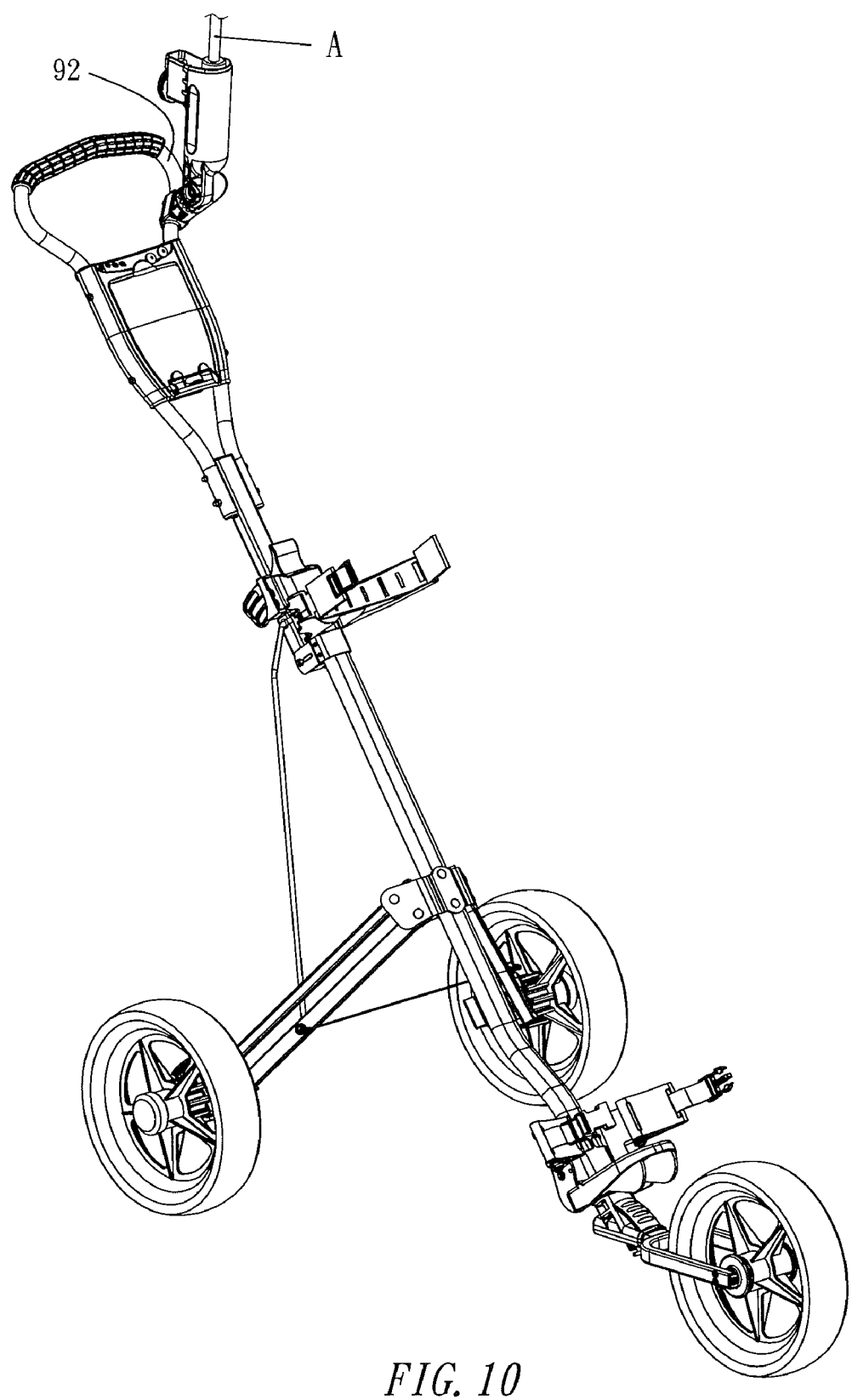
FIG. 10 is a perspective view of the umbrella holder assembled on the handle of a golf handcart in the present invention.
Figure 11:
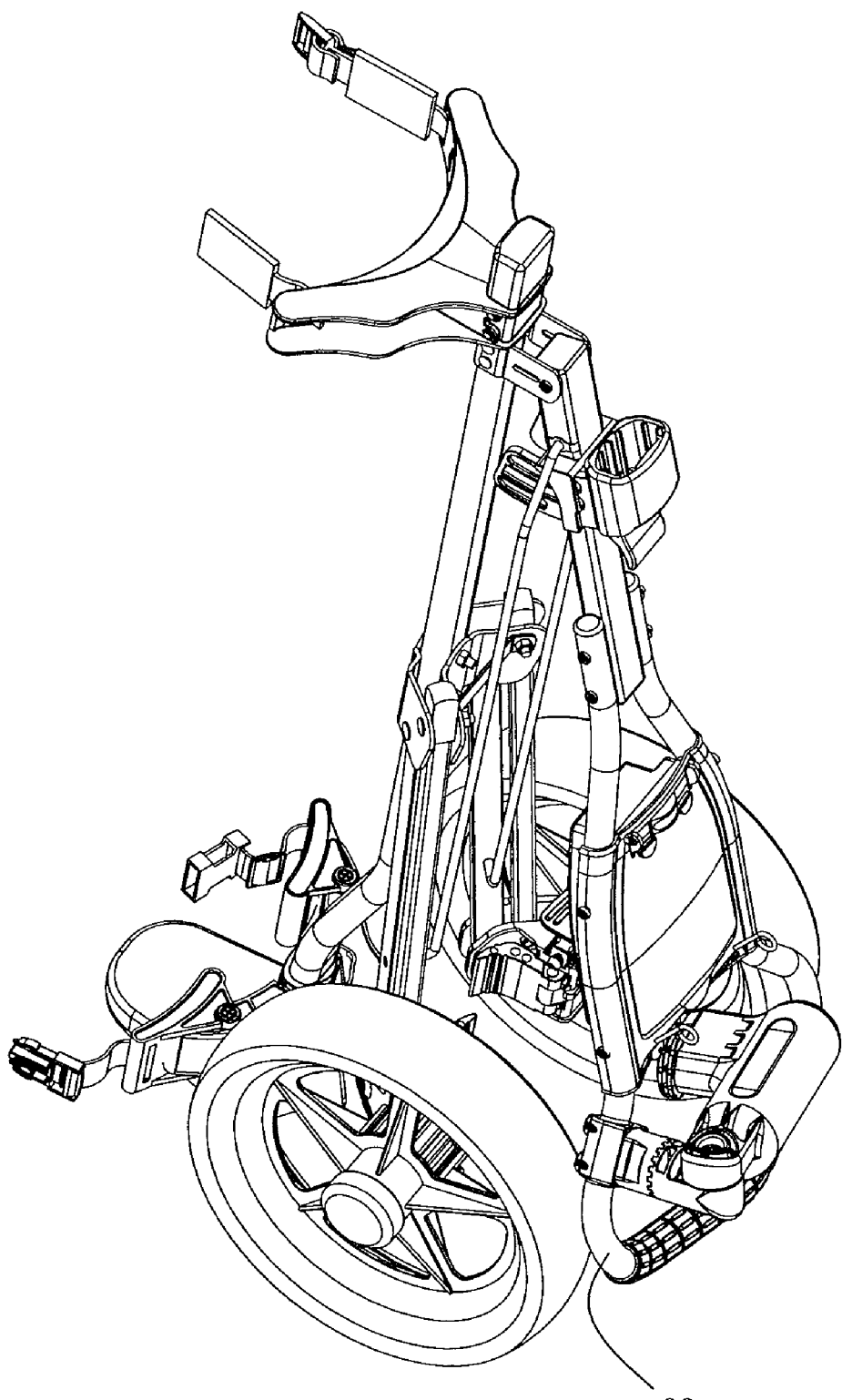
FIG. 11 is a perspective view of the umbrella holder assembled on the handle of a golf handcart in a collapsed condition in the present invention.

1. The threaded rod of the rotary button 51 is screwed with the female threads of the fixing block 53. Therefore, when the rotary button 51 is turned around, the fixing block 53 positioned in the tube 50 will be actuated to shift forward for tightening an umbrella handle A, or can be shifted backward to release the umbrella handle A for facilitating the umbrella to be taken out of the tube 10, as shown in FIG. 5. In addition, when operated, the threaded rod of the rotary button 51, which is kept in position by the stop plate 52, may turn idle. Therefore, the rotary button 51 can only be turned but cannot be moved to and fro. Moreover, the rotary button 51 is closely received in the recess 54 of the tube 50, thus forming a whole external look, and is safe and comfortable in use.
2. To have the first and second angle-adjusting mechanisms 6, 7 carrying out angle adjustment for the umbrella holder, simply press down or pull up the eccentric actuating member 65, 74, which is easy and quick in operation. Further, the eccentric actuating members 65 and 74 are respectively positioned and concealed in the recessed chambers 622 and 732, having a beautiful external profile.
3. By pulling up the eccentric actuating member 74 to move the engage hook 741 away from the engage recess 721, the second angle-adjusting mechanism 7 together with the pipe sleeve 8 will be separated from both the fixing shaft 72 and the tube 50, which is quick in disassembly.
4. By cooperation of the flat-bottom base 73 and the flat topside of the upper pipe sleeve 81, the umbrella holder of this invention can be firmly assembled on the scoreboard 91 of a golf handcart, as shown in FIGS. 3 and 8, or by combination of the upper and the lower pipe tubes 81 and 82, the umbrella holder of this invention can be secured on the handle 92 of a golf handcart, as shown in FIGS. 4 and 10, which is applicable extensively and practical in use. In addition, when the golf handcart is collapsed, the umbrella holder does not need to be removed from the handcart, as shown in FIGS. 9 and 10.

While the preferred embodiment of the invention has been described above, it will be recognized and understood that various modifications may be made therein and the appended claims are intended to cover all such modifications that may fall within the spirit and scope of the invention.

What is claimed is:

1. An umbrella holder comprising:
a tube with a center hollow for receiving an umbrella handle therein;
a fixing mechanism assembled on said tube, with a rotary button formed with a threaded rod screwed with a fixing block positioned in said tube for tightening or releasing the umbrella handle, with said threaded rod of said rotary button kept in position by a stop plate;
a first angle-adjusting mechanism positioned at a lower side of said tube, with said first angle-adjusting mechanism provided with an immovable geared disk and a movable geared disk matching each other, with said movable geared disk disposed on a rotary base, said rotary base set with an eccentric actuating member operated to engage or disengage said immovable geared disk with said movable geared disk; and
a second angle-adjusting mechanism positioned under said first angle-adjusting mechanism, with said second angle-adjusting mechanism provided with an immovable geared disk and a movable geared disk matched mutually, with said immovable geared disk of the second angle-adjusting mechanism secured at a lower end of said rotary base and provided with a fixed shaft, with said movable geared disk of the second angle-adjusting mechanism positioned at an upper end of a base, with said base pivotally mounted with an eccentric actuating member, which said eccentric actuating member of the second angle-adjusting mechanism operated to engage or disengage said base and said fixed shaft for engaging or disengaging said immovable geared disk and said movable geared disk of the second angle-adjusting mechanism, wherein said fixed shaft of said second angle-adjusting mechanism is cut with an engage recess, and wherein said eccentric actuating member of said second angle-adjusting mechanism is provided with an engage hook corresponding with said engage recess.

2. An umbrella holder as claimed in claim 1, further comprising: a shaft rod inserted through both said immovable geared disk and said movable geared disk of said first angle-adjusting mechanism, and a spring fitted on said shaft rod between said immovable geared disk of said first angle-adjusting mechanism and said rotary base, with said eccentric actuating member eccentrically and pivotally connected at one end of said shaft rod.

3. An umbrella holder as claimed in claim 1, wherein said eccentric actuating member of said first angle-adjusting mechanism is received in a recessed chamber of said rotary base.

4. An umbrella holder as claimed in claim 1, wherein said eccentric actuating member of said second angle-adjusting mechanism is received in a recessed chamber of said base.

5. An umbrella holder as claimed in claim 1, wherein an underside of said base is a flat surface having two fixing bolts secured thereon for a pipe sleeve to be inserted therethrough.

6. An umbrella holder as claimed in claim 5, wherein said pipe sleeve is composed of an upper half pipe sleeve and a lower half pipe sleeve, with said upper pipe sleeve having a topside formed with a flat surface and an underside formed with a semi-circle, with said lower half pipe sleeve having a topside formed with a semi-circle.

\* \* \* \* \*